United States Patent [19]

Kawasaki et al.

[11] Patent Number: 5,325,100
[45] Date of Patent: Jun. 28, 1994

[54] SIGNAL PROCESSING CIRCUIT FOR GPS RECEIVER

[75] Inventors: Kenichiro Kawasaki; Shozaburo Sakaguchi, both of Saitama, Japan

[73] Assignee: Pioneer Electronic Corporation, Tokyo, Japan

[21] Appl. No.: 59,264

[22] Filed: May 11, 1993

[30] Foreign Application Priority Data

May 12, 1992 [JP] Japan .................................. 4-119023

[51] Int. Cl.⁵ ........................ H04B 7/185; G01S 5/02
[52] U.S. Cl. .................................. 342/357; 455/12.1
[58] Field of Search ....................... 342/357; 455/12.1

[56] References Cited
U.S. PATENT DOCUMENTS 5,134,407  7/1992  Lorenz et al. .................. 342/352
5,223,843  6/1993  Hutchinson ..................... 342/352

Primary Examiner—Theodore M. Blum
Attorney, Agent, or Firm—Sughrue, Mion, Zinn, Macpeak & Seas

[57] ABSTRACT

A signal processing circuit for a GPS receiver wherein the search time for a code phase is decreased to decrease the time required for catching of radio waves of an artificial satellite without increasing the circuit scale very much. The signal processing circuit comprises, in addition to a carrier correlator and a code correlator, a change-over circuit for changing over the connection to the code correlator so that the code correlator operates as a carrier correlator before wave forms of an object artificial satellite are caught but operates as a code correlator after waveforms of the object artificial satellite are caught.

3 Claims, 3 Drawing Sheets

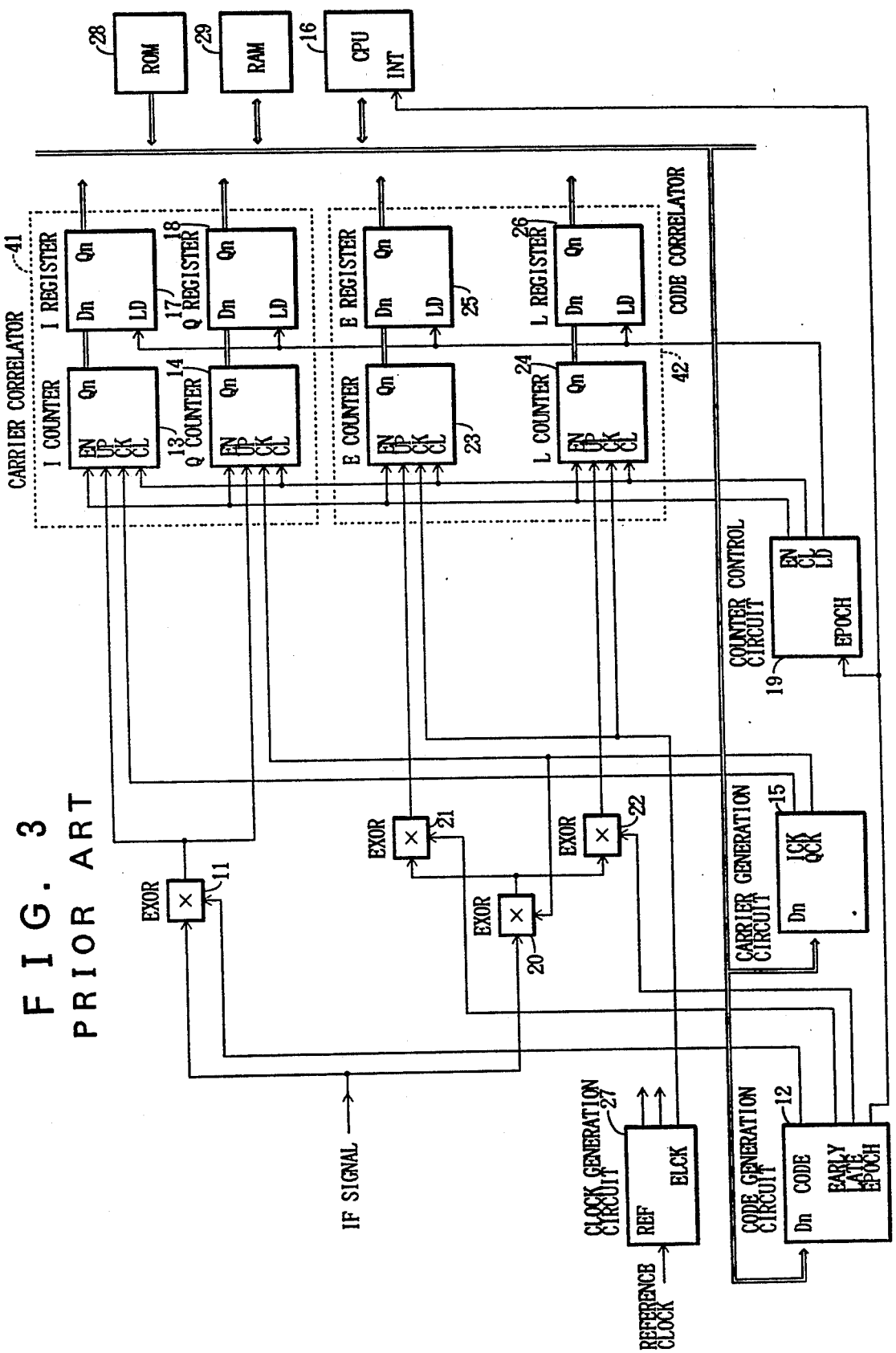

SIGNAL PROCESSING CIRCUIT FOR GPS RECEIVER

BACKGROUND OF THE INVENTION

1. Field of the Invention

This invention relates to a signal processing circuit for a GPS receiver.

2. Description of the Related Art

Signals transmitted from GPS (Global Positioning System) artificial satellites include signals which can be utilized commercially. Those signals open to commercial use are obtained by modulating a carrier by phase modulation with navigation data which may include information of an orbit of an artificial satellite and further modulating the phase modulated carrier by spectrum dispersion modulation with a code called C/A code peculiar to the artificial satellite.

In a GPS receiver, a code synchronized with a C/A code included in a reception signal is generated to perform reverse spectrum dispersion, and then a carrier synchronized with a carrier component of the reception signal is reproduced to demodulate navigation data. Synchronous tracing of a carrier to catch radio waves from an artificial satellite is performed by means of a Costas loop. To this end, a carrier generation circuit and a carrier correlator which includes a counter and a register are provided. Meanwhile, synchronous tracing of a code to calculate a pseudo distance to an artificial satellite is performed by a delay lock loop (DLL). To this end, a code generation circuit and a code correlator which includes a counter and a register are provided.

In order to catch radio waves of an artificial satellite, a correlation between a carrier generated in the receiver and a reception signal is found out by means of a carrier correlator using a code of an object artificial satellite, and a peak of the correlation is searched while successively changing the frequency of the carrier and the phase of the code to catch radio waves from the object artificial satellite. After radio waves from the object artificial satellite are caught once, the difference in phase between the reception signal and the carrier generated in the receiver is monitored and the carrier generation circuit is controlled so as to effect synchronous tracing of the carrier of the reception signal. It is to be noted that, before radio waves from the object artificial satellite are caught, the code correlator for measuring the phase difference for synchronous tracing of a code and calculation of a pseudo distance is not used.

After radio waves from the object artificial satellite are caught in such a manner as described above, the phase difference between a code component included in the reception signal and the code generated in the receiver is measured using the code correlator, and the code generation circuit is controlled so as to effect synchronous tracing of the code phase and calculate the pseudo distance to the artificial satellite from the thus measured phase difference. Such catch of radio waves of an artificial satellite and calculation of a pseudo distance are individually performed for a number of artificial satellites necessary for position measurement, and the position at present is calculated from navigation data thus obtained and the pseudo distances to the artificial satellites.

Construction and operation of a conventional GPS receiver will be described in detail below with reference to FIGS. 2 and 3 which show an RF (radio frequency) circuit and a signal processing circuit, respectively, of the conventional GPS receiver.

Referring first to FIG. 2, the RF circuit shown converts a reception signal into an IF (intermediate frequency) signal.

In particular, radio waves transmitted from a GPS artificial satellite are received by means of an antenna 1 and amplified by a low-noise amplifier (LNA) 2, whereafter they are mixed with an output of a local oscillator (LO) 4 by a mixer 3 so that they are converted into a signal of an intermediate frequency (IF). The output signal of the mixer 3 is supplied to an IF-BPF (IF band pass filter) 5, in which unnecessary noise and disturbance components are removed from the signal. The output signal of the IF-BPF 5 is amplified by an IF amplifier (SMP) 6 and then shaped by waveform shaping by a limiter 7 so that it is outputted as an IF signal of a pulse waveform from the limiter 7.

A reference oscillator (REF) 8 supplies to the local oscillator 4 a reference clock signal which makes a reference of frequency. The local oscillator 4 constructs a PLL (Phase Locked Loop) based on the reference clock signal and generates a local signal for converting a reception signal into an IF signal. The reference clock signal of the reference oscillator 8 is supplied also to the signal processing circuit shown in FIG. 3.

Referring now to FIG. 3, the signal processing circuit shown catches radio waves from an object artificial satellite based on the IF signal and the reference clock signal transmitted thereto from the RF circuit of FIG. 2 using a carrier correlator and measures the phsse difference of a code for calculation of a pseudo distance using a code correlator.

In particular, the IF signal transmitted from the RF circuit to the signal processing circuit is multiplied by a CODE (code) signal of an object artificial satellite supplied thereto from a code generator 12 by an exclusive OR (EXOR) circuit 11 to remove a code component of the signal, and then inputted to UP terminals of an I counter 13 and a Q counter 14.

The I counter 13 and the Q counter 14 are reversible counters of the synchronization type and each operates such that, when a clock signal inputted to a CK (clock) terminal thereof rises while the input to the UP terminal is "1", it counts up, but when the clock signal rises while the input to the UP terminal is "0", it counts down.

A carrier generation circuit 15 generates an I clock signal (ICK) and a Q clock (QCK) signal of a frequency which is set by a CPU (central processing unit) 16. The I clock (ICK) signal and the Q clock (QCK) signal are set such that they are displaced by 90 degrees in phase from each other, and the I clock (ICK) signal is supplied to the CK terminal of the I counter 13 while the Q clock (QCK) signal is supplied to the CK terminal of the Q counter 14. The count values of the I counter 13 and the Q counter 14 are outputted from Qn terminals of them and transferred to the CPU 16 by way of an I register 17 and a Q register 18, respectively.

Using the values of the I and Q registers 17 and 18, the CPU 16 calculates a signal strength of the reception signal in accordance with such an expression as, for example, $I^2+Q^2$ or $|I|+|Q|$, and when the signal strength thus calculated exceeds a particular threshold level, the CPU 16 determines that radio waves from the object artificial satellite have been caught and ends the searching operation of radio waves of an artificial satellite. Thereafter, the signal processing circuit performs synchronous tracing of the carrier by means of a Costas loop and synchronous tracing of the code by means of a DLL by monitoring the correlation value obtained from the carrier correlator 41.

The code generation circuit 12 generates a CODE (code) signal synchronized with a code component included in the reception signal, an EARLY (advanced) signal advanced by 0.5 chips in phase from the CODE signal, and a LATE (delay) signal delayed by 0.5 chips in phase from the CODE signal. Contents of the code of the CODE signal are set by the CPU 16 so that they may coincide with a C/A code of an object artificial satellite from which radio waves are to be received.

The phases of the CODE signal, the EARLY signal and the LATE signal can be advanced or delayed by a suitable amount in accordance with an instruction from the CPU 16. The code generation circuit 12 produces an EPOCH (epoch) signal synchronized with the CODE signal and supplies it to a counter control circuit 19. The EPOCH (epoch) signal is such a signal that, for example, it presents "1" only at the head position of the CODE signal, and serves as a reference signal for operation of the counter control circuit 19 and the CPU 16.

After radio waves of the object artificial satellite are caught using the carrier correlator 41 as described above, the IF signal is supplied to an EXOR circuit 20 to which the Q clock (QCK) signal from the carrier generation circuit 15 is supplied, and a carrier component of the IF signal is removed by the EXOR circuit 20. The IF signal outputted from the EXOR circuit 20 is supplied to a pair of EXOR circuits 21 and 22.

The IF signal is thus multiplied by the EARLY signal and the LATE signal by the EXOR circuits 21 and 22, respectively, and the results of the multiplication are supplied to UP terminals of an E counter 23 and an L counter 24, respectively. The count values of the E counter 23 and the L counter 24 are outputted from Qn terminals of them and transferred to the CPU 16 by way of an E register 25 and an L register 26, respectively.

The count value of the E counter 23 represents the degree of correlation between the EARLY signal, which is advanced by 0.5 chips in phase from the CODE signal, and the code component in the IF signal while the count value of the L counter 24 represents the degree of correlation between the LATE signal, which is delayed by 0.5 chips in phase from the CODE signal, and the code component in the IF signal. The CPU 16 calculates the difference between the count value of the E counter 23 and the count value of the L counter 24 to find out a phase difference between the CODE signal outputted from the code generation circuit 12 and the code component included in the IF signal to monitor to determine whether or not synchronization with the CODE signal is established.

The counter control circuit 19 outputs an enable signal EN, a clear signal CL and a load signal LD with reference to the EPOCH signal supplied thereto from the code generation circuit 12. Each of the counters 13, 14, 23 and 24 has an EN (enable) terminal and a CL (clear) terminal for controlling its counting operation in synchronism with a clock signal supplied thereto. A counting operation of each of the counters 13, 14, 23 and 24 is enabled when the input signal to the EN terminal is, for example, "1", but disabled when the input signal to the EN terminal is "0". Further, the count value of each of the counters 13, 14, 23 and 24 is cleared when a clock signal supplied thereto rises while the input to the CL terminal is, for example, "1", but when the input to the CL terminal is "0", it does not have an influence on operation of the counter.

Each of the counters 13, 14, 23 and 24 performs an accumulating (counting) operation of a correlation value supplied thereto for the time of one period (1 msec) of the C/A code and transfers the result of the accumulation to the register 17, 18, 25 or 26, respectively. For example, when an EPOCH signal is generated at the head of a code, the counter control circuit 19 controls its enable signal EN to stop operation of the counters and raises its load signal LD to cause the accumulated values till then to be loaded into the respective registers.

After such transfer of the accumulated values to the registers, the counter control circuit 19 controls its clear signal CL to clear the counters and then controls its enable signal EN to allow operation of the counters to be resumed. Consequently, the counters perform their respective accumulating operations of correlation values for the time of one period of the C/A code again.

Each of the registers 17, 18, 25 and 26 has an LD (load) terminal and fetches a signal at an input terminal Dn thereof when the input to the LD terminal is, for example, "1". The thus fetched value is thereafter held until the input to the LD terminal rises to "1" again even if the input value to the input terminal Dn changes, and is outputted from an output terminal Qn of the register 17, 18, 25 or 26.

A clock generation circuit 27 produces various clock signals to be supplied to the components of the signal processing circuit with reference to the reference clock signal supplied thereto from the RF circuit shown in FIG. 2. Particularly, the clock generation circuit 27 supplies a clock signal ELCK to the E counter 23 and the L counter 24.

The CPU 16 executes control programs of the receiver stored in a ROM (read only memory) 28 making use of a RAM (random access memory) 29. The CPU 16 has an interrupt input terminal INT, to which the EPOCH signal from the code generation circuit 12 is connected so that an interrupt processing program, which is one of the control programs, is started in the CPU 16 in response to the EPOCH signal and values of the registers are read into the CPU 16 in synchronism with the EPOCH signal.

Until after radio waves of an object artificial satellite are caught, the CPU 16 controls the carrier generation circuit 15 and the code generation circuit 12 to perform searching of a carrier frequency and a code phase using the carrier correlator 41. The range of the search of the carrier frequency depends upon the range of variation of a Doppler frequency of the artificial satellite and the frequency deviation of the reference oscillator (reference numeral 8 in FIG. 2) of the receiver. The range of the search of the code phase is one period (1,023 chips) of the code.

When radio waves of an artificial satellite are to be searched, the CPU 16 monitors the degree of correlation with the reception signal using the EXOR circuit 11 and the carrier correlator 41 while successively changing, at a certain carrier frequency, the phase of a code, generated by the code generation circuit 12, by one chip. Then, after the search over 1,023 chips is completed, the frequency of the carrier generated by the carrier generation circuit 15 is changed by a suitable frequency width, for example, a frequency width equal to a capture range width of the Costas loop constituted from the I and Q registers 17 and 18, the carrier generation circuit 15 and the CPU 16, and then at the new frequency position, the degree of correlation is found again while successively changing the phase of the code by one chip to repeat searching of radio waves of an artificial satellite.

In the search of radio waves of an artificial satellite described above, one correlation operation of each phase requires the time of 1 msec which is the time equal to one period of the code. Accordingly, in order to search radio waves of an artificial satellite over the entire frequency deviation range, the time of 1 msec×1.023×total step number of the frequency is required.

The result of correlation of the code phase for one period in the search of radio waves of an artificial satellite is accumulated in the I counter 13 and the Q counter 14, and the results of accumulation of them are stored into the I register 17 and the Q register 18, respectively. The CPU 16 calculates a value serving as an index to correlation in accordance with such an expression as $I^2+Q^2$ or $|I|+|Q|$ from the values of the I register 17 and the Q register 18, and when the value obtained exceeds a particular threshold value, the CPU 16 determines that radio waves of the object artificial satellite are caught, and ends its searching operation. Thereafter, the CPU 16 performs synchronous tracing of the reception signal by means of the Costas loop and the DLL.

Upon synchronous tracing of the reception signal, the CPU 16 finds out the difference in phase between the reception signal and the carrier generated from the carrier generation circuit 15 from the values of the I register 17 and the Q register 18 and applies a calculation of a loop filter to the phase difference thus found out, and then controls the carrier generation circuit 15 based on the result of the calculation so that the frequency and the phase of the carrier to be generated from the carrier generation circuit 15 may follow the reception signal. Simultaneously, the CPU 16 calculates, from the values of the E register 25 and the L register 26, the difference in phase between the reception signal and the CODE signal generated from the code generation circuit 12 and applies a calculation of a loop filter to the phase difference thus calculated, and then controls the code generation circuit 12 based on the result of the calculation so that the phase of the CODE signal to be generated from the code generation circuit 12 may follow the reception signal.

As described above, the signal processing circuit of the conventional GPS receiver includes the carrier correlator 41 including the I and Q counters 13 and 14 and the I and Q registers 17 and 18 and the code correlator 42 including the E and L counters 23 and 24 and the E and L registers 25 and 26 and uses the correlators 41 and 42 independently of each other for the respective processes.

Accordingly, processing for catching radio waves of an artificial satellite must be performed using the carrier correlator, and consequently, the conventional signal processing circuit for a GPS receiver has a problem that much time is required before radio waves of an object artificial satellite are caught. A GPS receiver particularly of the vehicle-carried type or of the portable type in most cases employs a reference oscillator having a large frequency deviation in order to achieve reduction of the cost. Such reference oscillator, however, involves a comparatively wide search range of carrier frequency and requires a long period of time until radio waves of an object artificial satellite are caught.

A possible solution to the problem described above may be to prepare a plurality of carrier correlators for use for catching of radio waves of an artificial satellite and cause the carrier correlators to operate parallelly to each other. The possible solution, however, gives rise to a new problem that the circuit scale is increased and the receiver becomes expensive.

SUMMARY OF THE INVENTION

It is an object of the present invention to provide a signal processing circuit for a GPS receiver wherein the search time for a code phase is decreased to decrease the time required for catching of radio waves of an artificial satellite without increasing the circuit scale very much.

In order to attain the object described above, according to the present invention, there is provided a signal processing circuit for a GPS receiver, which comprises a carrier generator for generating a carrier, a carrier correlator for detecting a correlation between the carrier from the carrier correlator and a carrier component of an input signal to the signal processing circuit, a code generator for generating a code, a code correlator for detecting a correlation between the code from the code generator and a code of the input signal, a clock generator for generating a clock signal from the input signal, a change-over circuit connected to receive the input signal and output signals of the carrier generator, the code generator and the clock generator and having a pair of outputs connected to the code correlator, and control means for controlling the change-over circuit to selectively transmit input signals thereto to the code correlator so that the code correlator operates as a carrier correlator before wave forms of an object artificial satellite are caught but operates as a code correlator after waveforms of the object artificial satellite are caught. The change-over circuit may include one or more multiplexers. Preferably, the code generator generates, in addition to the code, a second signal having a phase displaced by a predetermined amount from the code signal, and the signal processing circuit for a GPS receiver further comprises an exclusive OR circuit for receiving and exclusive ORing the input signal and the second signal and outputting a resultant signal to the change-over means.

In the signal processing circuit for a GPS receiver, before radio waves from an object artificial satellite are caught by the GPS receiver, the code correlator operates as a carrier correlator, and accordingly, a catching operation for radio waves of an artificial satellite is performed by both of the carrier correlator and the code correlator which operates as a carrier correlator, in short, substantially by two carrier correlators. Consequently, the search time for a code phase for catching of radio waves of an object artificial satellite is reduced to one half that required by a conventional GPS receiver with the simple construction wherein only the change-over circuit is additionally provided, possibly together with an exclusive OR circuit. Further, since the existing code correlator is utilized as a carrier correlator, the searching rate of radio waves of an artificial satellite is improved with a considerable increase of the circuit scale.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a circuit diagram showing a signal processing circuit of a conventional GPS receiver.

DESCRIPTION OF THE PREFERRED EMBODIMENT

Figure 1:
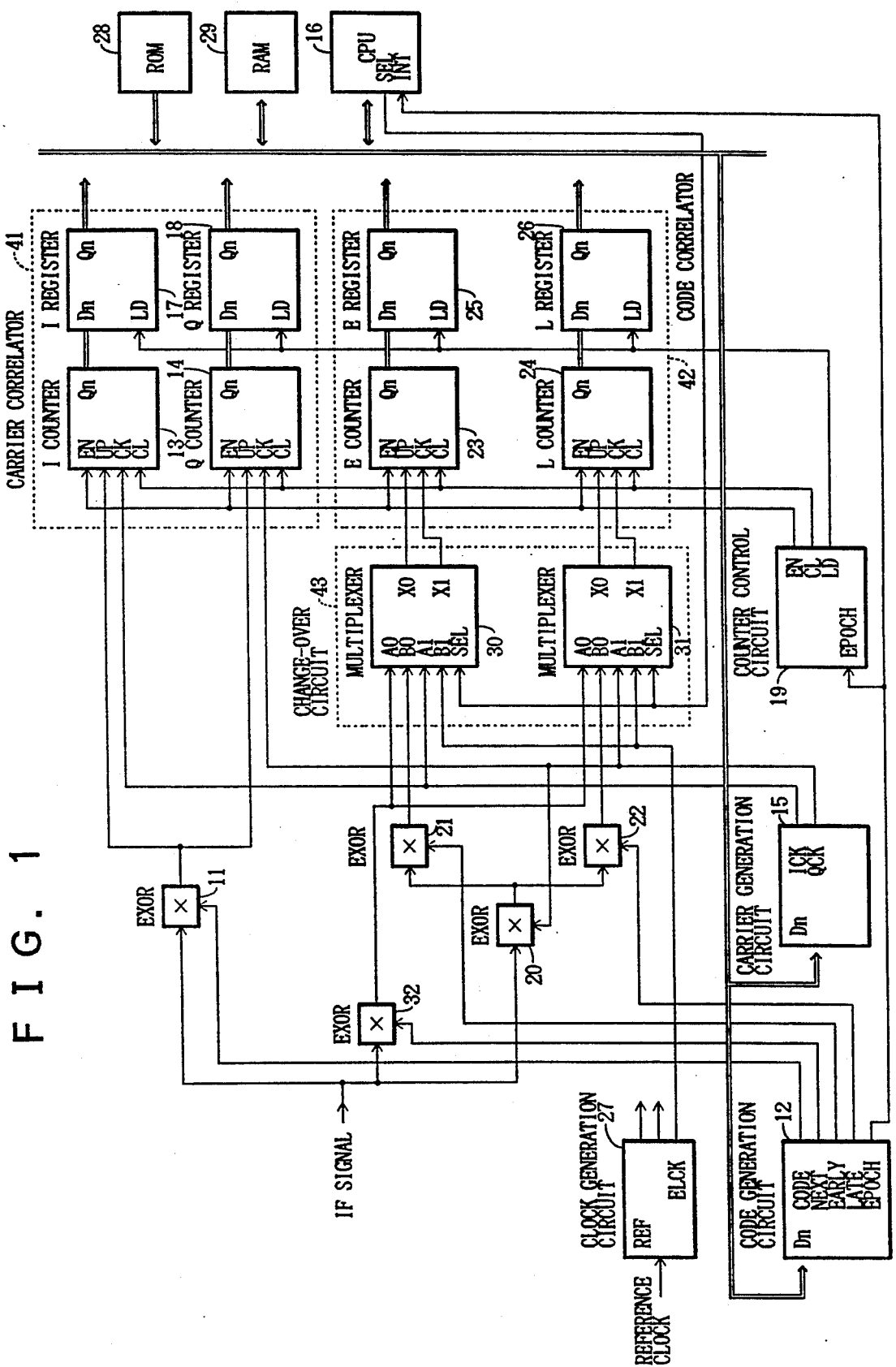
FIG. 1 is a circuit diagram of a signal processing circuit for a GPS receiver showing a preferred embodiment of the present invention.
Figure 2:
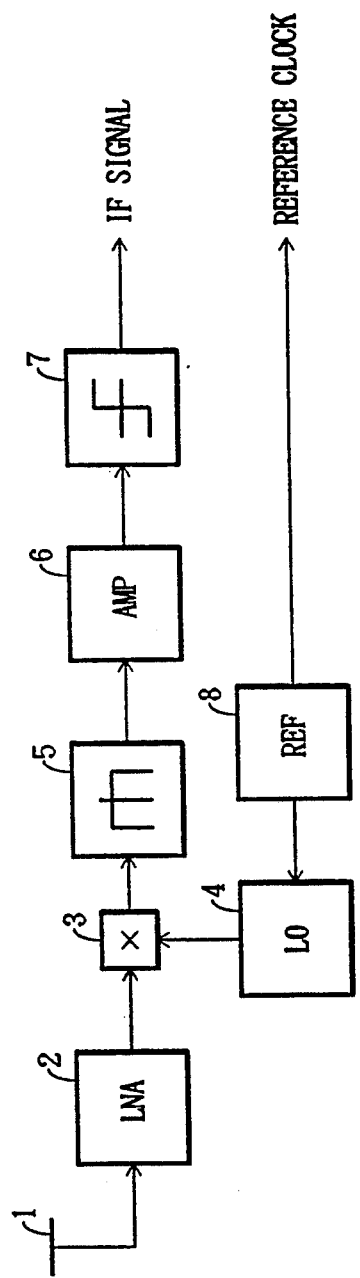
FIG. 2 is a block diagram showing an RF circuit of a conventional GPS receiver.

Referring to FIG. 1, there is shown a signal processing circuit for a GPS receiver to which the present invention is applied. The signal processing circuit shown includes EXOR circuits 11, 20, 21 and 22, I, Q, E and L counters 13, 14, 23 and 24, I, Q, E and L registers 17, 18, 25 and 26, a code generation circuit 12, a carrier generation circuit 15, a counter control circuit 19, a clock generation circuit 27, a CPU 16, a ROM 28 and a RAM 29. The components of the signal processing circuit just mentioned are similar to those of the signal processing circuit of the conventional GPS receiver described hereinabove with reference to FIG. 3, and overlapping description thereof is omitted herein to avoid redundancy. The I and Q counters 13 and 14 and the I and Q registers 17 and 18 constitute a carrier correlator 41 while the E and L counters 23 and 24 and the E and L registers 25 and 26 constitute a code correlator 42.

The signal processing circuit further includes a pair of multiplexers 30 and 31 constituting a signal change-over circuit 43, and an EXOR circuit 32 for multiplying an input IF signal by a CODE signal.

Each of the multiplexers 30 and 31 has two pairs of input terminals A0, A1 and B0, B1 and a pair of output terminals X0 and X1, and further has a SEL (select) terminal for receiving a SEL (select) signal from the CPU 16. In response to a SEL (select) signal from the CPU 16, each of the multiplexers 30 and 31 changes over, upon operation for catching radio waves of an artificial satellite, so that the output terminal X0 is connected to the input terminal A0 and the output terminal X1 is connected to the input terminal A1. On the other hand, when the code correlator 42 is used as an original code correlator, the output terminal X0 is connected to the input terminal B0 and the output terminal X1 is connected to the output terminal B1.

In the present signal processing circuit, the code generation circuit 12 is modified such that it generates, in addition to a CODE signal synchronized with a code component included in a reception signal, an EARLY signal advanced by 0.5 chips in phase from the CODE signal and a LATE signal delayed by 0.5 chips in phase from the CODE signal, a NEXT (next) signal displaced by one chip in phase from the CODE signal. It is to be noted that the NEXT signal may be any of a signal advanced by one chip in phase from the CODE signal or another signal delayed by one chip in phase from the CODE signal.

In a catching operation for radio waves of an artificial satellite, the multiplexers 30 and 31 are changed over to the EXOR circuit 32 side in response to a SEL signal from the CPU 16 so that a signal from the EXOR circuit 32 is transmitted to the E counter 23 and the L counter 24, and I and Q clocks (ICK and QCK) of the carrier generation circuit 15 are inputted to the CK terminals of the E counter 23 and the L counter 24, respectively. Consequently, until after radio waves of an object artificial satellite are caught, the code correlator 42 constituted from the E and L counters 23 and 24 and the E and L registers 25 and 26 operates as a carrier correlator.

When the code correlator 42 is used as a carrier correlator, a NEXT signal is supplied from the code generation circuit 12 to the EXOR circuit 32 so that the correlation with a code component of the reception signal is found out by the code correlator 42 using a code of the EXOR circuit 32 displaced by one chip in phase from that of the EXOR circuit 11. Accordingly, since the correlation can be found out successively while successively displacing the phase of the code by two chips using the two carrier correlators 41 and 42, the time required for searching of the code phase at a certain frequency is reduced to (1 msec × 1,023)/2. Accordingly, the time is reduced to one half that with the conventional signal processing circuit.

After the catching operation of radio waves of the object artificial satellite is completed, each of the multiplexers 30 and 31 is changed over from the EXOR circuit 32 side to the EXOR circuits 21 and 22 side in response to the SEL signal from the CPU 16. Consequently, the code correlator 42 thereafter operates as an original code correlator.

It is to be noted that, while the NEXT signal outputted from the code generation circuit 12 in the signal processing circuit of the embodiment described above is a signal displaced by one chip in phase from the CODE signal, it may otherwise be displaced by an arbitrary number of chips in phase from the CODE signal. Further, while the change-over circuit 43 is constituted from the two multiplexers 30 and 31, naturally it may be constituted from some other switching elements.

Having now fully described the invention, it will be apparent to one of ordinary skill in the art that many changes and modifications can be made thereto without departing from the spirit and scope of the invention as set forth herein.

What is claimed is:

1. A signal processing circuit for a GPS receiver, comprising:
   a carrier generator for generating a carrier;
   a carrier correlator for detecting a correlation between the carrier from said carrier generator and a carrier component of an input signal to said signal processing circuit;
   a code generator for generating a code;
   a code correlator for detecting a correlation between the code from said code generator and a code of the input signal;
   a clock generator for generating a clock signal;
   a change-over circuit connected to receive the input signal and output signals of said carrier generator, said code generator and said clock generator and having a pair of outputs connected to said code correlator; and
   controlling means for controlling said change-over circuit to selectively transmit input signals thereto to said code correlator so that said code correlator operates as a carrier correlator before wave forms of an object artificial satellite are caught but operates as a code correlator after waveforms of the object artificial satellite are caught.

2. A signal processing circuit for a GPS receiver as claimed in claim 1, wherein said change-over circuit includes one or more multiplexers.

3. A signal processing circuit for a GPS receiver as claimed in claim 1, wherein said code generator generates, in addition to the code, a second signal having a phase displaced by a predetermined amount from the code signal, and further comprising an exclusive OR circuit for receiving and exclusive ORing the input signal and the second signal and outputting a resultant signal to said change-over means.

* * * * *